(12) United States Patent
Lee et al.

(10) Patent No.: US 12,422,995 B2
(45) Date of Patent: Sep. 23, 2025

(54) COMPUTATIONAL STORAGE DEVICE COMMUNICATING WITH HOST USING SHARED MEMORY AND OPERATING METHOD THEREOF

(71) Applicant: SK hynix Inc., Icheon-si (KR)

(72) Inventors: Jin Suk Lee, Icheon-si (KR); Won Kyung Kang, Icheon-si (KR); Soo Jin Kim, Icheon-si (KR); Sung Hyuk Jung, Icheon-si (KR); Jun Seop Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/638,541

(22) Filed: Apr. 17, 2024

(65) Prior Publication Data

US 2025/0173061 A1 May 29, 2025

(30) Foreign Application Priority Data

Nov. 28, 2023 (KR) .................. 10-2023-0167465

(51) Int. Cl.
*G06F 3/06* (2006.01)

(52) U.S. Cl.
CPC .......... *G06F 3/0613* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 2006/0101202 A1* | 5/2006 | Mannen | G06F 11/1076 711/114 |
| 2021/0334234 A1 | 10/2021 | Yudanov | |

FOREIGN PATENT DOCUMENTS

| | | | | |
|---|---|---|---|---|
| CN | 115510101 A | * | 12/2022 | ......... G06F 16/2282 |
| KR | 10-2022-0092990 A | | 7/2022 | |
| WO | WO-2016013099 A1 | * | 1/2016 | ............. G06F 16/00 |

* cited by examiner

*Primary Examiner* — Brian R Peugh

(57) ABSTRACT

A computational storage device comprises a shared memory directly accessible by a host, a computational storage processor, a storage media configured to store base data, and a storage processor. The computational storage processor reads request information written to the shared memory by the host, and responds to the host with result data for the request information. The computational storage processor reads base data stored in a storage media, extracts result data from the base data, writes the result data to the shared memory, and transmits, to the host, a notification indicating that the result data has been written to the shared memory.

10 Claims, 7 Drawing Sheets

COMPUTATIONAL STORAGE DEVICE COMMUNICATING WITH HOST USING SHARED MEMORY AND OPERATING METHOD THEREOF

CROSS-REFERENCE TO RELATED APPLICATION

The present application claims priority under 35 U.S.C. § 119 (a) to Korean Patent Application No. 10-2023-0167465 filed in the Korean Intellectual Property Office on Nov. 28, 2023, which is incorporated herein by reference in its entirety.

BACKGROUND

1. Technical Field

Various embodiments of the disclosed technology generally relate to a computational storage device that communicates with a host using a shared memory, and an operating method thereof.

2. Related Art

A computational storage device is a storage device that can not only store data, but can also process data internally. Recently, the use of computational storage devices has been increasing in order to process big data more quickly.

Computational storage devices may receive a data input/output request from a host and transmit a result to the host. The performance of the host degrades as the frequency of data input and output between the host and the computational storage device increases.

SUMMARY

Various embodiments of the disclosed technology are directed to providing a computational storage device and an operating method thereof to reduce the frequency of data input and output to and from a host and to transmit and receive data more quickly to and from the host.

In an aspect, a computational storage device may include: i) a shared memory directly accessible by a host; ii) a computational storage processor configured to read request information written to the shared memory by the host, and respond to the host with result data for the request information; iii) a storage media configured to store base data; and iv) a storage processor configured to receive a read request for the base data from the computational storage processor, and read the base data from the storage media.

The computational storage processor may extract the result data from the base data, may write the result data to the shared memory, and may transmit, to the host, a notification indicating that the result data has been written to the shared memory.

In another aspect, a method for operating a computational storage device may include: i) reading request information from a shared memory directly accessible by a host, the request information written by the host to the shared memory; ii) reading base data from a storage media; iii) extracting result data for the request information from the base data; iv) writing the result data to the shared memory; and v) transmitting, to the host, a notification indicating that the result data has been written to the shared memory.

According to the embodiments of the disclosed technology, it is possible to reduce the frequency of data input and output to and from a host and transmit and receive data more quickly to and from the host.

DETAILED DESCRIPTION

Figure 1:
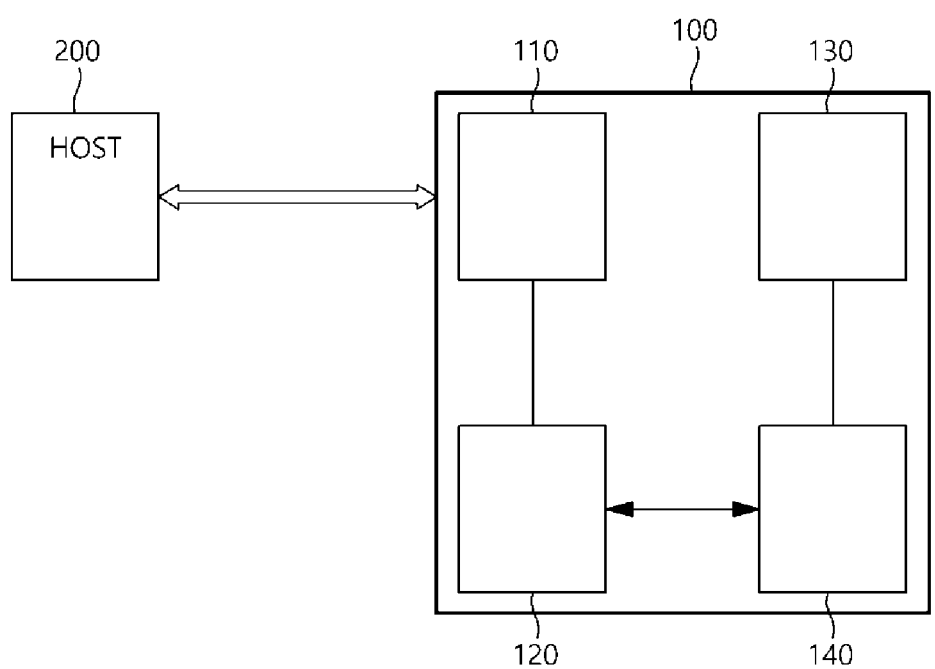
FIG. 1 is a schematic configuration diagram of a computational storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a computational storage device according to an embodiment of the disclosure.

Referring to FIG. 1, a computational storage device 100 may include a shared memory 110, a computational storage processor 120, a storage media 130 and a storage processor 140.

The shared memory 110 is a memory that is directly accessible by a host 200. This will be described later in detail with reference to FIG. 2.

The host 200 may directly access the shared memory 110 inside the computational storage device 100 to read or write data. The host 200 may read data or write data from or to a shared area, which is set in the shared memory 110 as an area to be shared by the host 200.

The host 200 may access the shared memory 110 on the basis of a preset interface (e.g., PCIe or Ethernet).

The host 200 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc. Alternatively, the host 200 may be a virtual reality (VR) device providing a 2D or 3D virtual reality image or an augmented reality (AR) device providing an augmented reality image. The host 200 may be any one of various electronic devices, each of which requires the computational storage device 100 capable of storing data.

The computational storage processor 120 may read request information written to the shared memory 110 by the host 200, and may respond to the host 200 with result data for the request information. This will be described later in detail with reference to FIG. 3.

The computational storage processor 120 may perform logical operations necessary to generate result data for the request information. The computational storage processor 120 may communicate with the host 200, and may communicate with the storage processor 140.

The computational storage processor 120 may communicate with the host 200 through a host interface. For example, the host interface may be an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol and a private protocol.

To this end, the computational storage processor 120 may execute firmware to perform the above-described logical operations. The computational storage processor 120 may execute (drive) firmware stored in the storage media 130 or a separate memory (e.g., a ROM, a NAND Flash, a NOR Flash, a PRAM or an MRAM). Hereafter, an operation of the computational storage device 100 described in embodiments of the disclosure may be implemented in such a way that the computational storage processor 120 executes firmware in which the corresponding operation is defined.

The firmware, as a program to be executed in the computational storage device 100 to drive the computational storage device 100, may include various functional layers. For example, the firmware may include binary data in which codes for executing the functional layers, respectively, are defined.

The storage media 130 may store base data. The base data may be data that is used by the computational storage processor 120 to process the request information of the host 200 and generate result data.

The storage media 130 may be implemented in various types.

For example, the storage media 130 may be implemented into types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The storage processor 140 may receive a read request for base data from the computational storage processor 120, and may read the base data from the storage media 130. This will be described later in detail with reference to FIG. 4.

Figure 2:
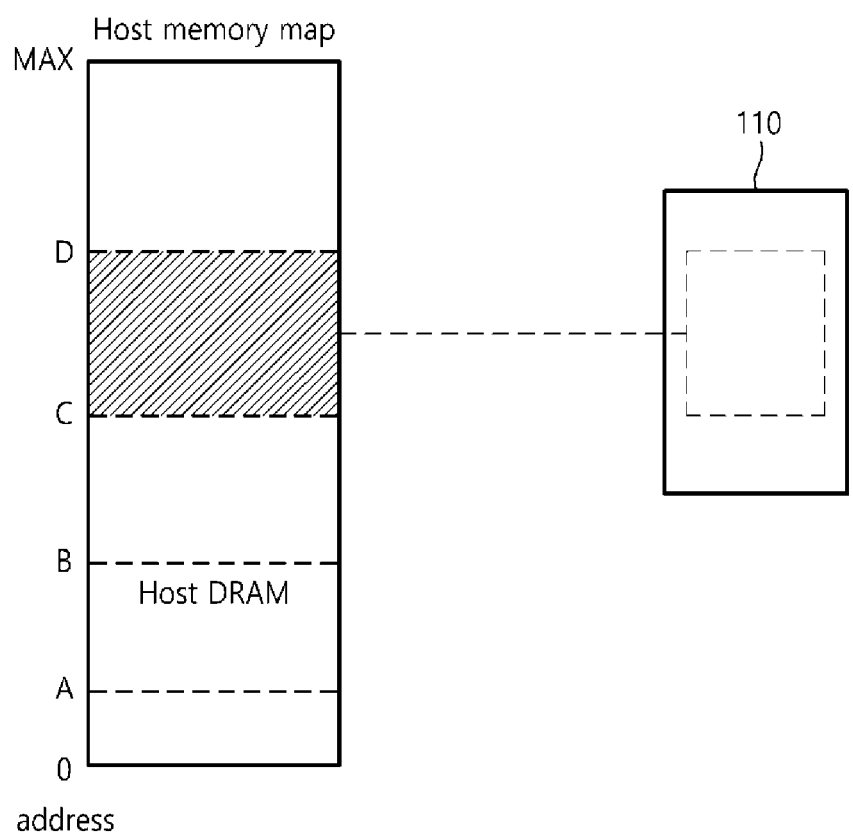
FIG. 2 is a diagram illustrating a memory map of a host according to an embodiment of the disclosure.

FIG. 2 is a diagram illustrating a memory map of a host according to an embodiment of the disclosure.

A host 200 may configure a memory map for an address space from addresses 0 to MAX according to an address system to be used. For example, the host 200 may configure a memory map for a 4 GB address space when a 32-bit address system is used, may configure a memory map for a 256 TB address space when a 48-bit address system is used, and may configure a memory map for a 16EiB address space when a 64-bit address system is used. An address may be a logical address that is managed by the host 200.

The host 200 may map a part of a configured address space to a specific device. The operation in which the host 200 maps a part of the address space to a specific device may be referred to as an operation of mirroring the corresponding device.

For example, the host 200 may map an address space from an address A to an address B to a DRAM, which is included in the host 200.

Referring to FIG. 2, the host 200 may map an address space from an address C to an address D to the shared memory 110 described above. For example, the host 200 may map the address space from the address C to the address D to the shared area in the shared memory 110.

Thereafter, by reading or writing data from or to the address space from the address C to the address D, the host 200 may directly read or write data from or to the shared memory 110.

When the host 200 reads data from the shared memory 110 or writes data to the shared memory 110, it is not necessary to transmit data according to a preset protocol (e.g., NVMe). Therefore, the host 200 may transmit and receive data more quickly to and from the computational storage device 100.

Figure 3:
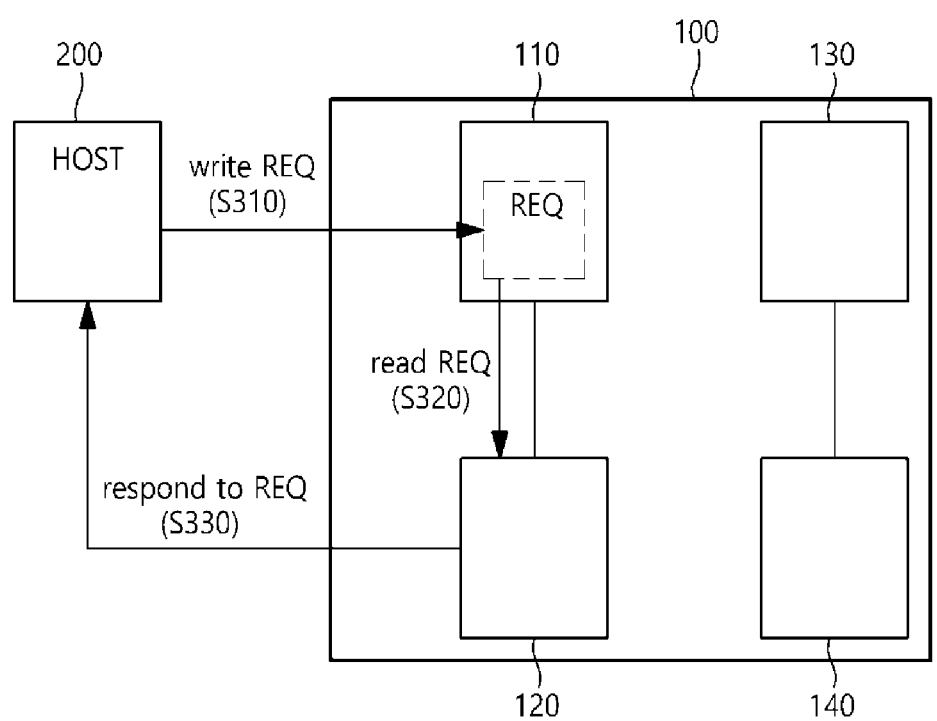
FIG. 3 is a diagram illustrating schematic operations of a computational storage device and a host according to an embodiment of the disclosure.

FIG. 3 is a diagram illustrating schematic operations of a computational storage device and a host according to an embodiment of the disclosure.

Referring to FIG. 3, a host 200 may write request information REQ to a shared memory 110 (S310).

In an embodiment, instead of generating a separate command for writing the request information REQ and transmitting the command to the computational storage device 100, the host 200 may directly write the request information REQ to the shared memory 110.

The request information REQ written to the shared memory 110 by the host 200 may be related to different data types.

For example, the request information REQ may include filter information, which is used by a database management system to filter a result value corresponding to a specific condition in a database.

The host 200 may drive the database management system and an application that reads or writes data through the database management system. The application may transmit a query to the database management system, and the database management system may generate the request information REQ including the above-described filter information and then write the request information REQ to the shared memory 110 to process the query.

The filter information included in the request information REQ may be determined in various ways.

For example, the filter information may include at least one of table information, index information, schema information and query information of the database managed by the above-described database management system. The base data described above with reference to FIG. 1 may include index data and table data stored in the database.

In this way, as the host 200 directly writes the request information REQ including the filter information to the shared memory 110, the host 200 does not need to consider an operation in which the computational storage device 100 receives and parses the filter information.

The computational storage processor 120 may read the request information REQ, which is written to the shared memory 110 by the host 200 (S320).

The computational storage processor 120 may determine whether the host 200 has written the request information REQ to the shared memory 110 in various ways.

For example, in order to determine whether the host 200 has written the request information REQ to the shared memory 110, the computational storage processor 120 may periodically scan whether the request information REQ has been written to the shared memory 110.

In another example, the computational storage processor 120 may detect an interrupt indicating that the request information REQ has been written to a preset area of the shared memory 110.

The computational storage processor 120 may respond to the request information REQ (S330). An operation in which the computational storage processor 120 generates a response to the request information REQ and transmits the generated response to the host 200 will be described below in detail with reference to FIGS. 4 to 6.

Figure 4:
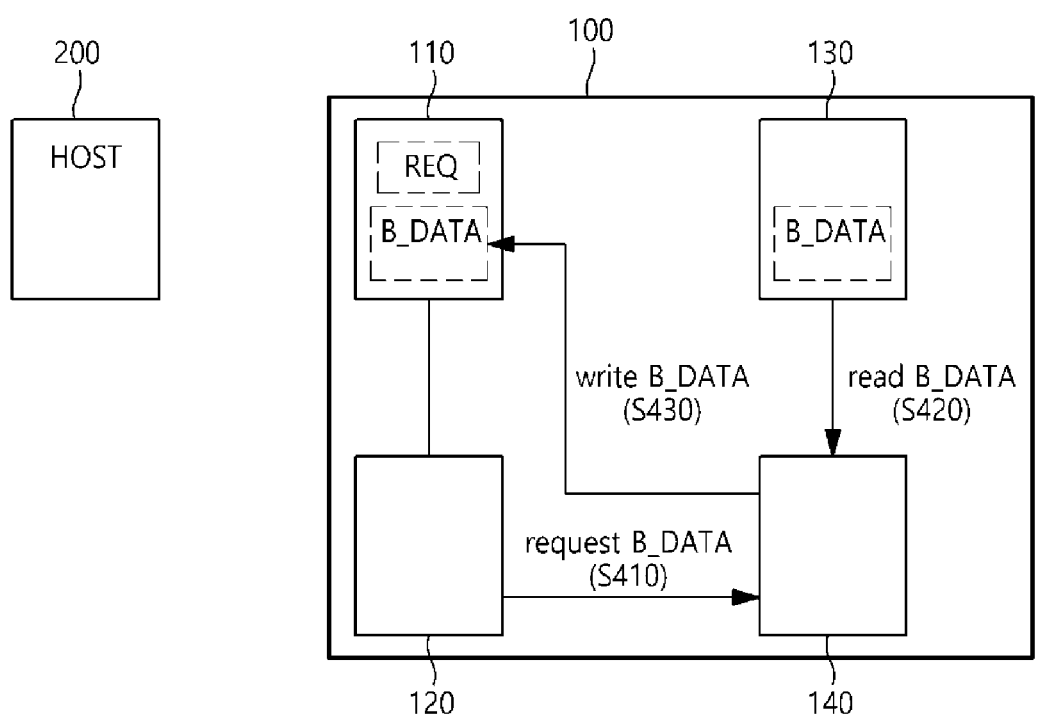
FIG. 4 is a diagram showing an operation in which a computational storage device reads base data according to an embodiment of the disclosure.

FIG. 4 is a diagram illustrating an operation in which a computational storage device reads base data according to an embodiment of the disclosure.

Referring to FIG. 4, a computational storage processor 120 may send a base data B_DATA request to a storage processor 140 (S410). In an embodiment, the computational storage processor 120 may not directly access the storage media 130, and instead, may send the request to the base data B_DATA to the storage processor 140.

After receiving the request from the computational storage processor 120, the storage processor 140 may read the base data B_DATA (S420).

The storage processor 140 may write the read base data B_DATA to the shared memory 110 (S430). In an embodiment, the storage processor 140 does not directly transfer the read base data B_DATA to the computational storage processor 120, and instead the computational storage processor 120 accesses the read base data B_DATA stored in the shared memory 110.

Figure 5:
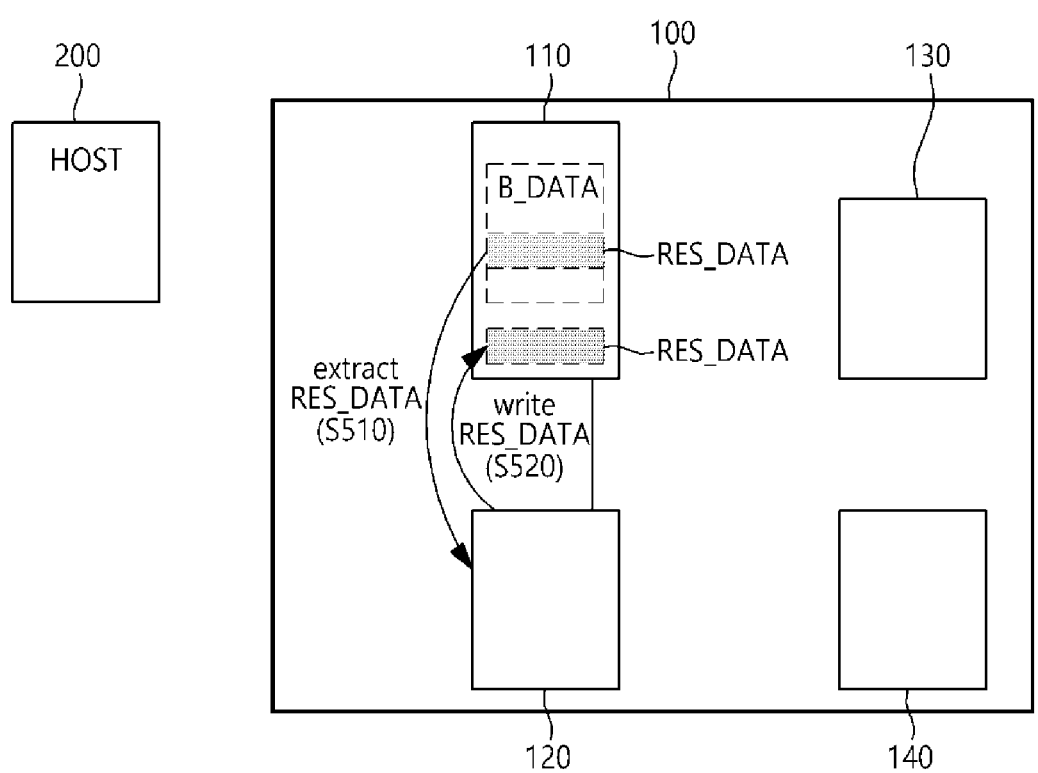
FIG. 5 is a diagram illustrating an operation in which a computational storage device extracts result data according to an embodiment of the disclosure.

FIG. 5 is a diagram illustrating an operation in which a computational storage device extracts result data RES_DATA according to an embodiment of the disclosure.

Referring to FIG. 5, a computational storage processor 120 may extract result data RES_DATA from base data B_DATA stored in a shared memory 110 (S510).

For example, when an above-described request information REQ includes filter information, the computational storage processor 120 may extract the result data RES_DATA from the base data B_DATA using the table information and index information of the database included in the filter information. The computational storage processor 120 may repeatedly scan the base data B_DATA to extract the result data RES_DATA.

The computational storage processor 120 may write the extracted result data RES_DATA to the shared memory 110 (S520). After writing the result data RES_DATA to the shared memory 110, the computational storage processor 120 may delete the base data B_DATA.

In an embodiment, instead of a host 200 directly extracting result data RES_DATA from base data B_DATA, the computational storage processor 120 may perform an operation of extracting result data RES_DATA and may transfer only the result data RES_DATA to the host 200. Therefore, the frequency of data input and output between the computational storage device 100 and the host 200 may be reduced.

Figure 6:
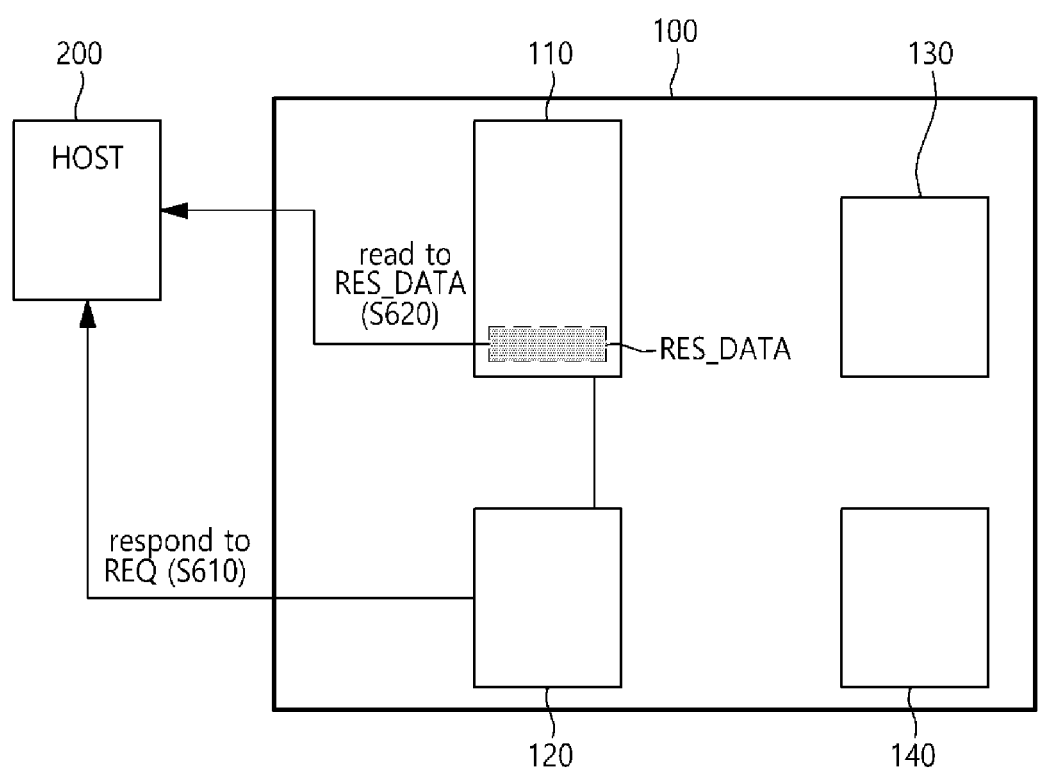
FIG. 6 is a diagram illustrating an operation in which a computational storage device responds to a host with result data according to an embodiment of the disclosure.

FIG. 6 is a diagram illustrating an operation in which a computational storage device responds to a host with result data RES_DATA according to an embodiment of the disclosure.

Referring to FIG. 6, a computational storage device 120 may transmit, to a host 200, a notification indicating that result data RES_DATA has been written to a shared memory 110 (S610).

The computational storage processor 120 may transmit the above-described notification to the host 200 in various ways.

For example, the computational storage processor 120 may transmit a command or signal indicating the above-described notification to the host 200.

In another example, the computational storage processor 120 may write the above-described notification to a preset area in a shared memory 110.

After receiving the notification from the computational storage processor 120, the host 200 may access the shared memory 110 and read the result data RES_DATA (S620).

For example, when the request information REQ includes an above-described filter information, the host 200 may transfer the result data RES_DATA to a database management system (not illustrated), and the database management system may transfer the result data RES_DATA to the application.

Figure 7:
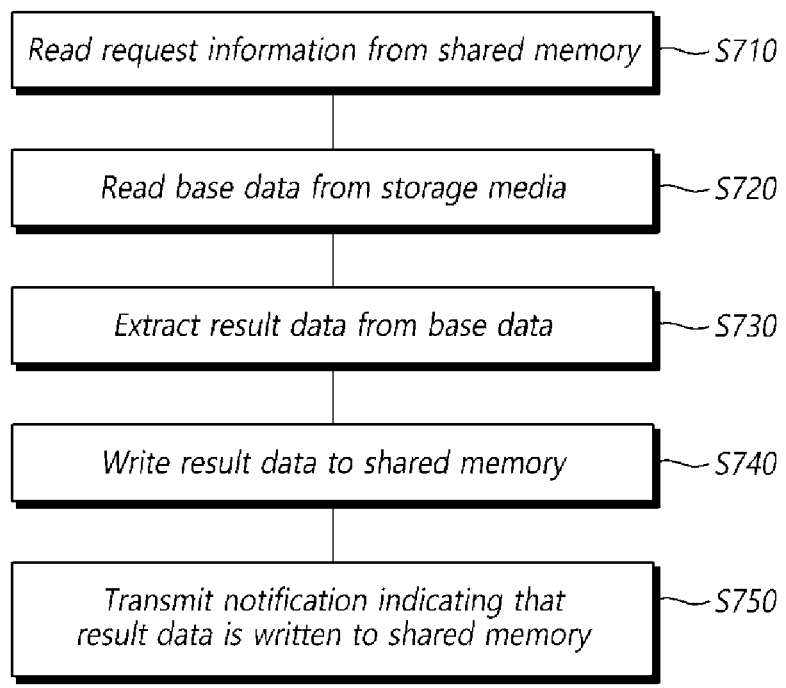
FIG. 7 is a diagram illustrating a method for operating a computational storage device according to an embodiment of the disclosure.

FIG. 7 is a diagram illustrating a method for operating a computational storage device according to an embodiment of the disclosure.

Referring to FIG. 7, a method for operating a computational storage device 100 may include a step S710 of reading, from a shared memory 110, request information REQ written to the shared memory 110 by a host 200. The host 200 may directly access the shared memory 110.

For example, the request information REQ may include filter information that is used by a database management system to filter a result value corresponding to a specific condition in a database.

The filter information may include at least one of table information, index information, schema information and query information of the database.

For example, the step S710 may include a step of periodically scanning whether the request information REQ has been written to the shared memory 110 or detecting an interrupt indicating that the request information REQ has been written to a preset area of the shared memory 110.

The method for operating the computational storage device 100 may include a step S720 of reading base data B_DATA from storage media 130. The read base data B_DATA may be written to the shared memory 110.

The method for operating the computational storage device 100 may include a step S730 of extracting the result data RES_DATA for the request information REQ from the read base data B_DATA.

The method for operating the computational storage device 100 may include a step S740 of writing the extracted result data RES_DATA to the shared memory 110.

The method for operating the computational storage device 100 may include a step S750 of transmitting, to the host 200, a notification indicating that the result data RES_DATA has been written to the shared memory 110.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A computational storage device comprising:
    a shared memory directly accessible by a host;
    a computational storage processor configured to read request information written to the shared memory by the host, and to respond to the host with result data for the request information;
    a storage media configured to store base data; and
    a storage processor configured to receive a read request for the base data from the computational storage processor, and read the base data from the storage media,
    wherein the computational storage processor extracts the result data from the base data, writes the result data to the shared memory, and transmits, to the host, a notification indicating that the result data has been written to the shared memory.

2. The computational storage device according to claim 1, wherein the request information comprises filter information that is used by a database management system to filter a result value corresponding to a specific condition in a database.

3. The computational storage device according to claim 2, wherein the filter information comprises at least one of table information, index information, schema information and query information of the database.

4. The computational storage device according to claim 3, wherein the base data comprises index data and table data stored in the database.

5. The computational storage device according to claim 1, wherein the computational storage processor periodically scans whether the request information has been written to the shared memory or detects an interrupt indicating that the request information has been written to a preset area of the shared memory.

6. The computational storage device according to claim 1, wherein the storage processor stores the base data, which is read from the storage media, in the shared memory.

7. A method for operating a computational storage device, comprising:
    reading request information from a shared memory directly accessible to a host, the request information written by the host to the shared memory;
    reading base data from a storage media;
    extracting result data for the request information from the base data;
    writing the result data to the shared memory; and
    transmitting, to the host, a notification indicating that the result data has been written to the shared memory.

8. The method according to claim 7, wherein the request information comprises filter information that is used by a database management system to filter a result value corresponding to specific condition in a database.

9. The method according to claim 8, wherein the filter information comprises at least one of table information, index information, schema information and query information of the database.

10. The method according to claim 7, wherein the reading of the request information comprises:
    periodically scanning whether the request information has been written to the shared memory or detecting an interrupt indicating that the request information has been written to a preset area of the shared memory.

* * * * *